(12) United States Patent
Lai et al.

(10) Patent No.: US 6,948,057 B2
(45) Date of Patent: Sep. 20, 2005

(54) MEMORY MODULES STORING THEREIN BOOT CODES AND METHOD AND DEVICE FOR LOCATING SAME

(75) Inventors: Jiin Lai, Taipei (TW); Jih-Hsin Tsai, Taipei (TW); Hsiang-I Huang, Kaohsiung (TW)

(73) Assignee: Via Technologies, Inc., Taipei (JP)

( * ) Notice: Subject to any disclaimer, the term of this patent is extended or adjusted under 35 U.S.C. 154(b) by 562 days.

(21) Appl. No.: 10/114,519

(22) Filed: Apr. 2, 2002

(65) Prior Publication Data

US 2003/0154370 A1 Aug. 14, 2003

Related U.S. Application Data

(60) Provisional application No. 60/355,241, filed on Feb. 8, 2002.

(30) Foreign Application Priority Data

Feb. 19, 2002 (TW) ........................................ 91102809 A

(51) Int. Cl.[7] ............................................ G06F 15/177
(52) U.S. Cl. ................................................. 713/2; 713/1
(58) Field of Search ................................. 713/1, 2, 100

(56) References Cited

U.S. PATENT DOCUMENTS

| 5,410,707 | A | * | 4/1995 | Bell ................................ 713/2 |
| 5,815,706 | A | * | 9/1998 | Stewart et al. .................. 713/2 |
| 6,295,603 | B1 | * | 9/2001 | Mischo ........................... 713/2 |
| 6,654,832 | B1 | * | 11/2003 | Meyer et al. ................ 710/100 |
| 6,766,474 | B2 | * | 7/2004 | Schelling ...................... 714/36 |
| 2001/0018721 | A1 | * | 8/2001 | McKenna et al. .......... 710/126 |
| 2003/0005277 | A1 | * | 1/2003 | Harding et al. ................ 713/2 |

FOREIGN PATENT DOCUMENTS

| NL | 9200295 | 2/1992 |
| WO | 0025208 | 4/2000 |

* cited by examiner

*Primary Examiner*—Dennis M. Butler
(74) *Attorney, Agent, or Firm*—Volpe & Koenig, P.C.

(57) ABSTRACT

A memory module storing therein boot codes, a core logic device capable of distinguishing such memory module from the other memory modules of the same module specification, and a method for realizing the boot codes from the memory module storing therein the boot codes are disclosed. All the memory modules are electrically connected to the core logic device via respective signal pins, but the memory module storing therein boot codes outputs an identifying signal different from the identifying signals outputted by the other memory modules in a booting process. Therefore, the core logic device can locate the memory module storing therein the boot codes, and the host device can accomplish the booting process by reading the boot codes from the specific memory module.

22 Claims, 4 Drawing Sheets

MEMORY MODULES STORING THEREIN BOOT CODES AND METHOD AND DEVICE FOR LOCATING SAME

CROSS-REFERENCE TO RELATED APPLICATIONS

This application claims priority from U.S. Provisional Patent Application Ser. No. 60/355,241, filed Feb. 8, 2002, which is incorporated herein by reference.

FIELD OF THE INVENTION

The present invention relates to a memory module storing therein boot codes, and more particular to a memory module storing therein boot codes and distinguishable from the other memory modules of the same module specification. The present invention also relates to a device and a method for locating the memory module storing therein boot codes among a plurality of memory modules.

BACKGROUND OF THE INVENTION

For booting a computer system, a microprocessor fetches a group of boot codes from a non-volatile memory to accomplish the self-test operation and realize the basic configuration data of the system. This group of boot codes is generally so-called as a basic input output system (BIOS), and the non-volatile memory for storing the boot code, typically implemented by a flash memory, is a BIOS chip.

Please refer to FIG. 1 which schematically shows the typical arrangement of the microprocessor and the BIOS chip in the current computer structure. As shown, the microprocessor 10 fetches the boot codes stored in the BIOS chip 13 via the north-bridge chip 11, the south-bridge chip 12 and related buses. In addition to the BIOS chip 13, the computer system also includes memory devices 14 electrically connected to the north-bridge chips 11. The memory devices 14 are dynamic random access memory (DRAM) modules in conventional computer architecture. Since Micron Technology, Inc. developed a flash memory called SyncFlash®, that can reside on the same bus with DRAM and execute from a single DRAM memory controller, it is now possible to use a SyncFlash® memory as one of the memory devices 14. Under this circumstance, it is feasible to use a SyncFlash dual in-line memory module (SyncFlash DIMM) to serve as the BIOS chip 13 for storing the boot codes, and inserted in one of the slots for the memory devices 14. By this way, the microprocessor 10 can rapidly fetch the boot codes via the north-bridge chip 11.

Unfortunately, just because the SyncFlash DIMM can be inserted in any of the slots for general DRAM modules, and the module specifications of the SyncFlash DIMM and DRAM modules are identical, the SyncFlash DIMM is unidentifiable for the north-bridge chip in the booting process. In other words, the boot codes stored in the SyncFlash DIMM cannot be successfully fetched.

SUMMARY OF THE INVENTION

Therefore, an object of the present invention is to provide a memory module for storing the boot codes, which is distinguishable from the other memory modules of the same module specification.

Another object of the present invention is to provide a core logic device capable of locating the memory module storing therein the boot codes among a plurality of memory modules of the same module specification.

A further object of the present invention is to provide a method for locating the memory module storing therein the boot codes among a plurality of memory modules of the same module specification.

A first aspect of the present invention relates to a memory module. The memory module is electrically connected to a computer system via a signal pin, stores therein boot codes required for booting the computer system, and outputs an identifying signal to the computer system via the signal pin to inform of the presence of the booting codes.

Preferably, the signal pin is a point-to-point signal pin such as a chip select pin or a clock enable pin.

Preferably, the memory module includes a pull-down resistor electrically connected to the signal pin for outputting the identifying signal as a low-level digital signal.

Alternatively, the memory module includes a pull-up resistor electrically connected to the signal pin for outputting the identifying signal as a high-level digital signal.

Preferably, the signal pin is electrically connected to a core logic device of the computer system, for example, a north-bridge chip.

Preferably, the identifying signal is outputted to the computer system in a booting process of the computer system.

The memory module can be a non-volatile memory, and preferably a SyncFlash® memory.

A second aspect of the present invention relates to a core logic device of a host device. The core logic device is electrically connected via respective signal pins to a plurality of memory modules. A specific one of the memory modules stores therein boot codes required for booting the host device. The core logic device receives identifying signals from the plurality of memory modules via the signal pins, respectively, and locates the specific memory module storing therein the boot codes according to the identifying signals.

In an embodiment, one of the signal pins is electrically connected to a pull-down resistor of the specific memory module storing the boot codes to receive a corresponding one of the identifying signals as a low-level digital signal, and the other signal pins are electrically connected to respective pull-up resistors to receive all the other identifying signals as high-level digital signals. The difference of the levels allows the core logic device to locate the specific memory module storing therein the boot codes.

In another embodiment, one of the signal pins is electrically connected to a pull-up resistor of the specific memory module storing the boot codes to receive a corresponding one of the identifying signals as a high-level digital signal, and the other signal pins are electrically connected to respective pull-down resistors to receive all the other identifying signals as low-level digital signals, thereby locating the specific memory module storing therein the boot codes.

The core logic device can be a chipset or a north-bridge chip of a chipset.

A third aspect of the present invention relates to a method for realizing boot codes from a memory module set, wherein the memory module set includes a plurality of memory modules electrically connected to a core logic device via respective signal pins. The method includes steps of: the core logic device receiving identifying signals from the memory modules via the respective signal pins in a booting process; the core logic device determining which one of the memory modules stores therein the boot codes according to the identifying signals; and allowing the boot codes to be read out from the memory module storing therein the boot codes.

In an embodiment, only the memory module storing the boot codes includes a pull-down resistor so that one of the identifying signals received by the core logic device via a corresponding one of the signal pins is a low-level digital signal, and all the other identifying signals are high-level digital signals. The difference of the levels facilitates to determine the memory module storing therein the boot codes.

In another embodiment, only the memory module storing the boot codes includes a pull-up resistor so that one of the identifying signals received by the core logic device via a corresponding one of the signal pins is a high-level digital signal, and all the other identifying signals are low-level digital signals, thereby determining the memory module storing therein the boot codes.

Preferably, the memory module for storing the boot codes is a non-volatile memory module, and the other memory modules are random access memory modules.

More preferably, the non-volatile memory module is a SyncFlash® memory module, and the random access memory modules are dynamic random access memory modules.

Particularly preferably, the SyncFlash® memory module is a SyncFlash dual in-line memory module, and the dynamic random access memory modules are dynamic random access dual in-line memory modules.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
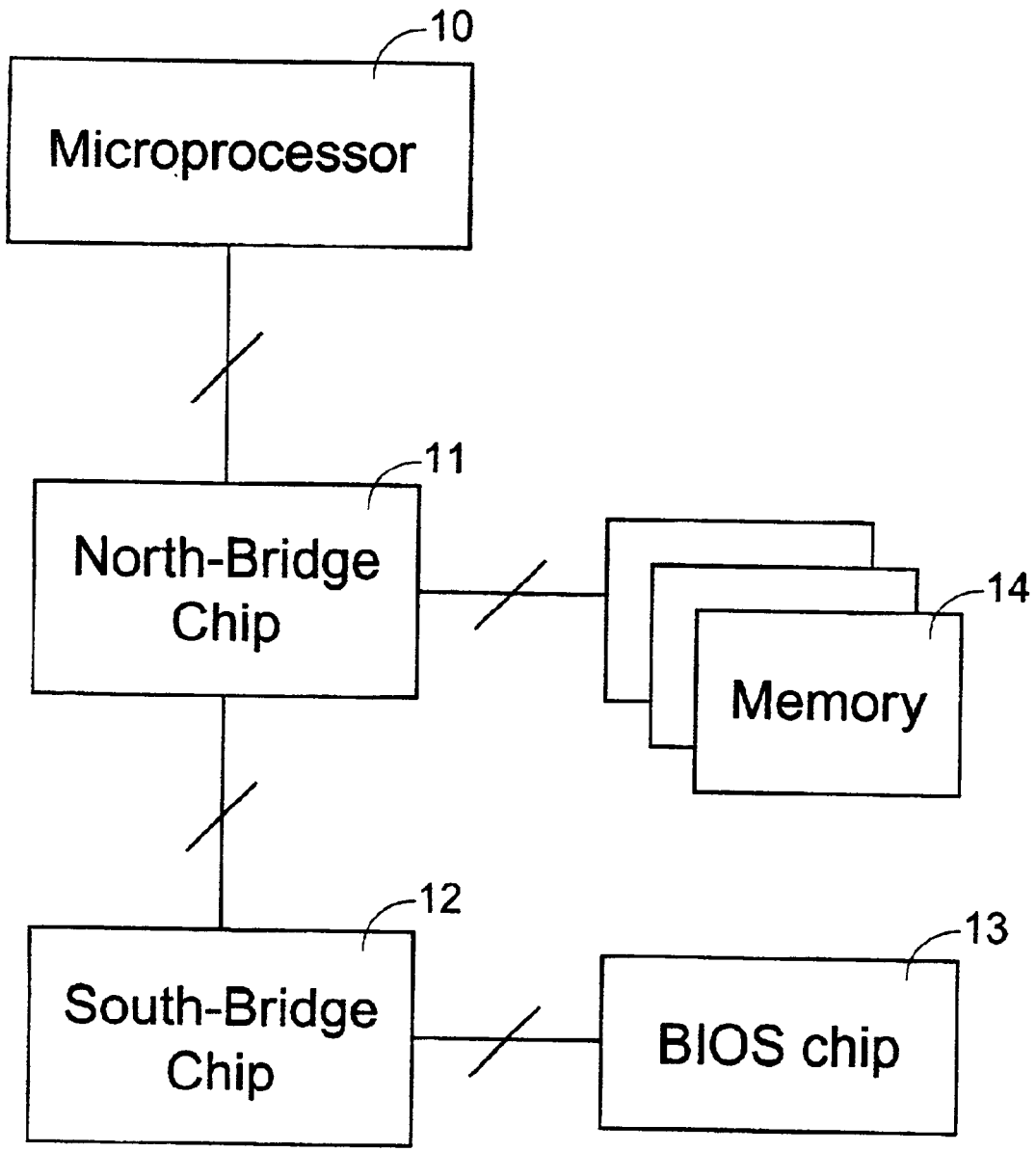
FIG. 1 is a schematic functional block diagram illustrating a partial computer architecture according prior art.
Figure 2:
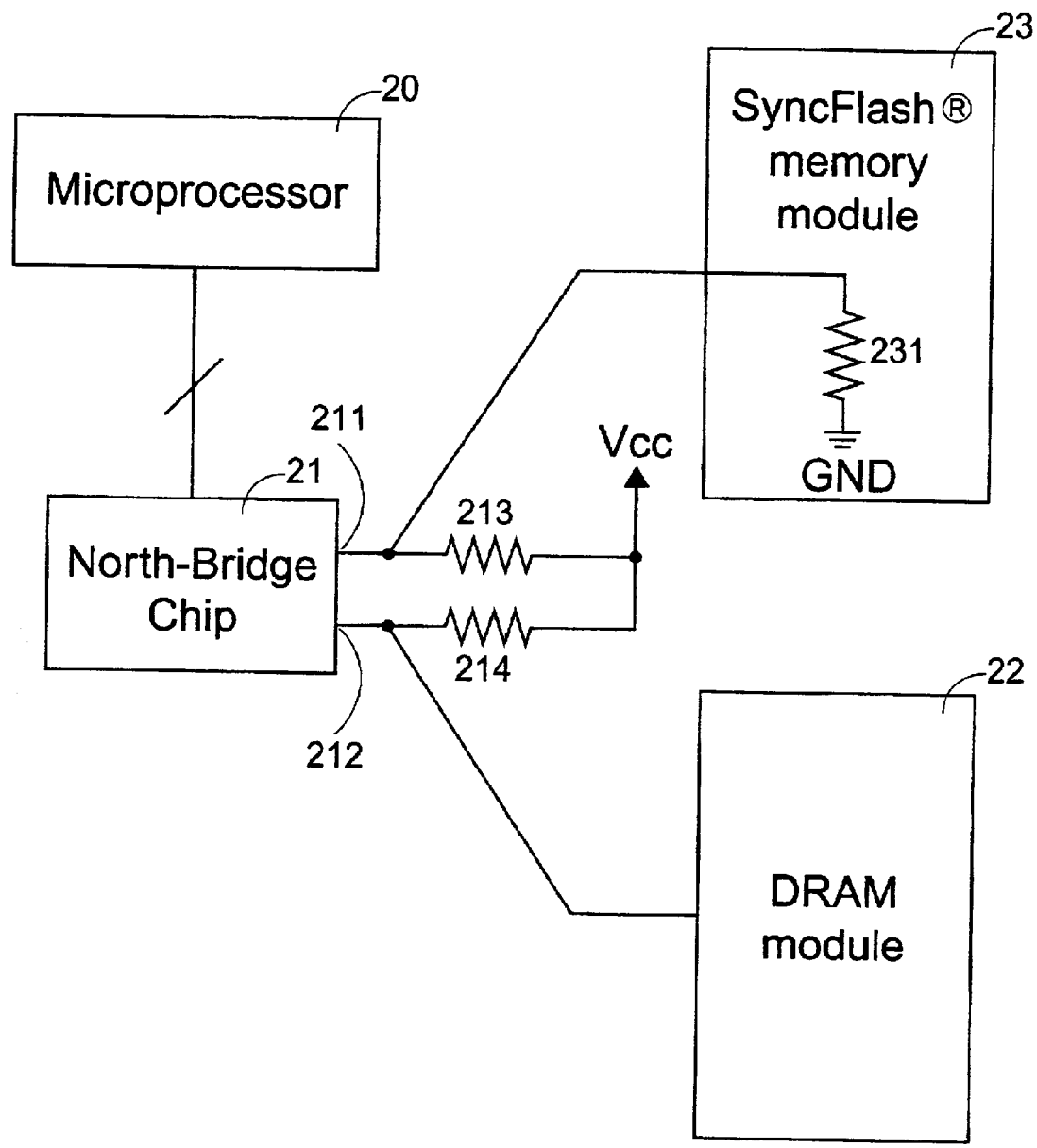
FIG. 2 is a schematic functional block diagram illustrating a preferred embodiment of a partial computer architecture according to the present invention.

Please refer to FIG. 2 which schematically shows how the microprocessor 20 fetches boot codes from a memory module according to a first embodiment of the present invention. In this embodiment, the memory module storing therein boot codes is a SyncFlash® dual in-line memory module 23 inserted into the slot conventionally for a DRAM module, and electrically connected to the north-bridge chip 21 along with another DRAM module 22. The memory module 23 exclusively includes a pull-down resistor 231. The chip select pin 211 of the north-bridge 21 is electrically connected to a pull-up resistor 213 to Vcc and the chip select pin of the memory module 23 and further the pull-down resistor 231 to ground. The chip select pin 212 of the north-bridge chip 21, on the other hand, just electrically connected to a pull-up resistor 214 to Vcc and the chip select pin of the DRAM module 22. By making the resistance of the pull-down resistor 231 much smaller than that of the pull-up resistor 213, the pull-down effect will be much more significant than the pull-up effect.

When a booting or a resetting process is executed, the north-bridge chip 21 will receive identifying signals from the memory modules 22 and 23 via the chip select pins 212 and 211, respectively. While the identifying signal associated with the chip select pin 212 is detected to be "high" due to the pull-up effect, the identifying signal associated with the chip select pin 211 is detected to be "low" due to the stronger pull-down effect. By detecting the voltage levels of the identifying signals, the north-bridge chip 21 can locate the memory module 23 storing therein the boot codes, and the microprocessor 20 can fetch the boot codes from the memory module 23 via the north-bridge chip 21 to accomplish the following booting or resetting procedures.

Figure 3:
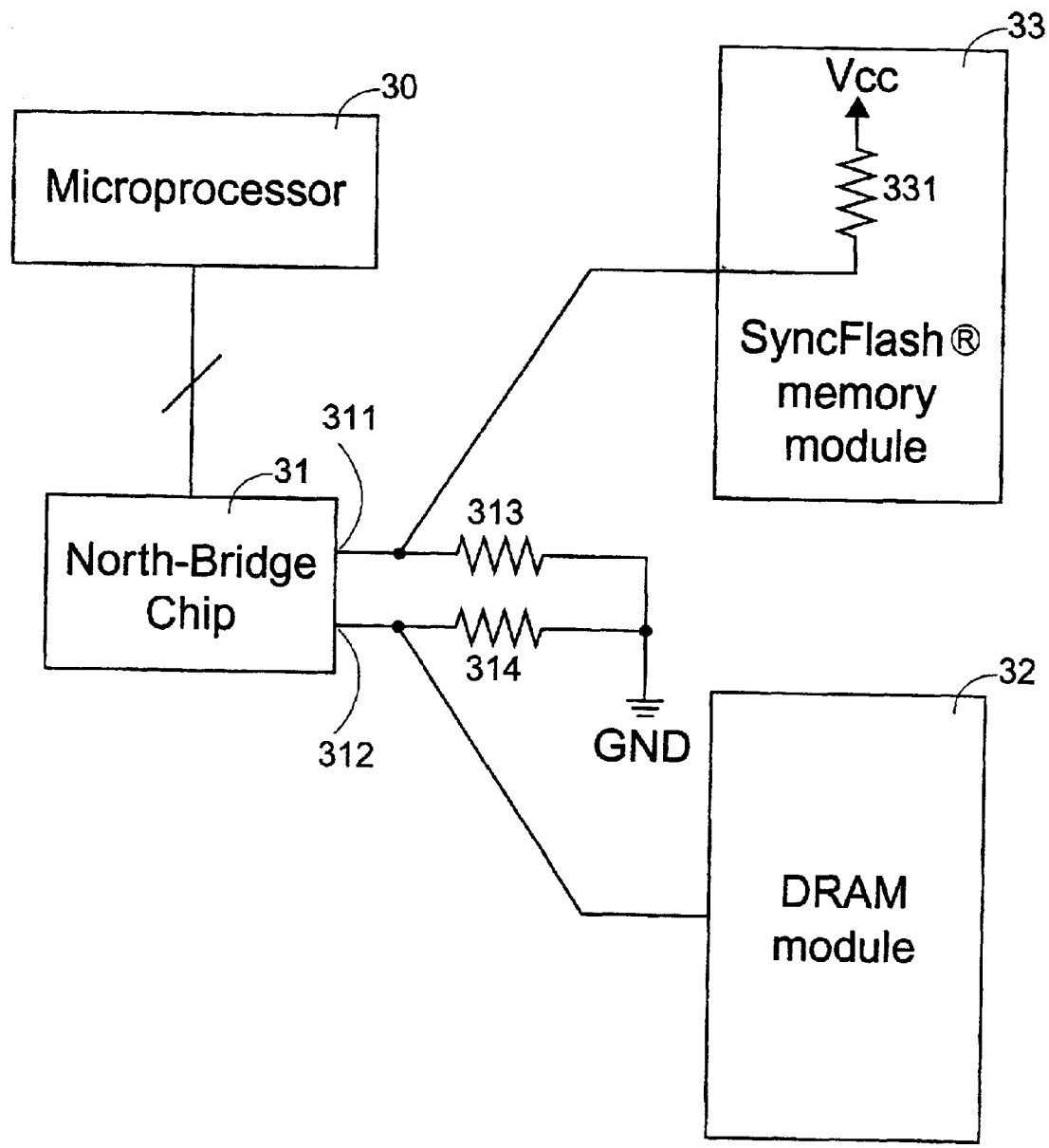
FIG. 3 is a schematic functional block diagram illustrating another preferred embodiment of a partial computer architecture according to the present invention.

Please refer to FIG. 3 which schematically shows how the microprocessor 30 fetches boot codes from a memory module according to a second embodiment of the present invention. Similar to the above embodiment, the memory module storing therein boot codes is implemented by a SyncFlash® dual in-line memory module 33 inserted into the slot conventionally for a DRAM module, and electrically connected to the north-bridge chip 31 along with another DRAM module 32. The memory module 33 exclusively includes a pull-up resistor 331. The chip select pin 311 of the north-bridge 31 is electrically connected to a pull-down resistor 313 to ground and the chip select pin of the memory module 33 and further the pull-up resistor 331 to Vcc. The chip select pin 312 of the north-bridge chip 31, on the other hand, just electrically connected to a pull-down resistor 314 to ground and the chip select pin of the DRAM module 32. By making the resistance of the pull-up resistor 331 much smaller than that of the pull-down resistor 313, the pull-up effect will be much more significant than the pull-down effect.

When a booting or a resetting process is executed, the north-bridge chip 31 will receive identifying signals from the memory modules 32 and 33 via the chip select pins 312 and 311, respectively. While the identifying signal associated with the chip select pin 312 is detected to be "low" due to the pull-down effect, the identifying signal associated with the chip select pin 311 is detected to be "high" due to the stronger pull-up effect. By detecting the voltage levels of the identifying signals, the north-bridge chip 31 can locate the memory module 33 storing therein the boot codes, and the microprocessor 30 can fetch the boot codes from the memory module 33 via the north-bridge chip 21 to accomplish the subsequent booting or resetting procedures.

Figure 4B:
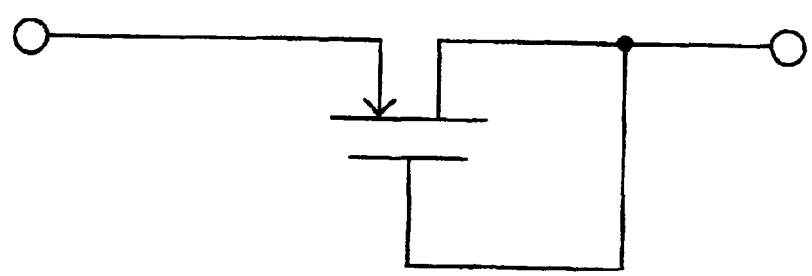
FIGS. 4(A) and 4(B) are MOS transistors, each connected as a resistance.
Figure 4A:
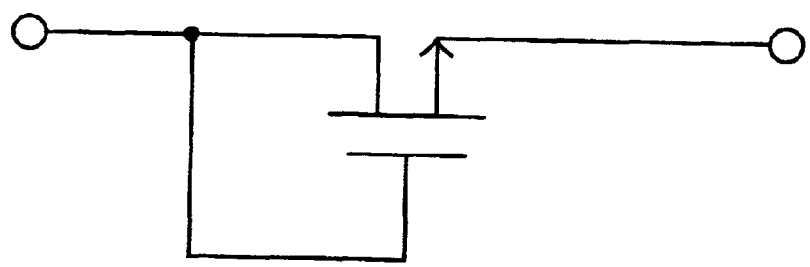

It is understood from the above description that according to the present invention, the memory module storing therein boot codes can be easily distinguished from the other memory modules even though the memory modules are of the same module specification. In addition to chip select pins, any other point-to-point pins between a north-bridge chip and memory modules can be used to achieve the same purpose. One of the examples is clock enable (CKE) pins. In order to be highly applied to the IC manufacturing process, the above-mentioned pull-up or pull-down resistors can also be implemented by MOS transistors and designed inside the north-bridge chip 21 or 31, as shown in FIGS. 4(A) and 4(B). Further, aside from the north-bridge chip of a computer system, the present invention can be applied to any other similar core logic device for locating the memory module storing therein boot codes required for booting or resetting a host device.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A memory module electrically connected to a core logic device of a computer system via a point-to-point signal pin, storing therein boot codes required for booting said computer system, and outputting an identifying signal to said core logic device of said computer system via said point-to-point signal pin to inform of the presence of said booting codes therein.

2. The memory module according to claim 1 wherein said point-to-point signal pin is selected from a group consisting of a chip select pin and a clock enable pin.

3. The memory module according to claim 1 comprising a pull-down resistor electrically connected to said point-to-point signal pin for outputting said identifying signal as a low-level digital signal.

4. The memory module according to claim 1 comprising a pull-up resistor electrically connected to said point-to-point signal pin for outputting said identifying signal as a high-level digital signal.

5. The memory module according to claim 1 wherein said core logic device is a north-bridge chip.

6. The memory module according to claim 1 wherein said identifying signal is outputted to said core logic device of said computer system in a booting process of said computer system.

7. The memory module according to claim 1 comprising a non-volatile memory for storing said boot codes.

8. A core logic device of a host device, electrically connected via respective point-to-point signal pins to a plurality of memory modules, a specific one of which stores therein boot codes required for booting said host device, receiving identifying signals from said plurality of memory modules via said point-to-point signal pins, respectively, and locating said specific memory module storing therein said boot codes according to said identifying signals.

9. The core logic device according to claim 8 wherein said point-to-point signal pins are selected from a group consisting of chip select pins and clock enable pins.

10. The core logic device according to claim 8 wherein one of said point-to-point signal pins is electrically connected to a pull-down resistor of said specific memory module storing said boot codes to receive a corresponding one of said identifying signals as a low-level digital signal, and the other point-to-point signal pins are electrically connected to respective pull-up resistors to receive all the other identifying signals as high-level digital signals, thereby locating said specific memory module storing therein said boot codes.

11. The core logic device according to claim 8 wherein one of said point-to-point signal pins is electrically connected to a pull-up resistor of said specific memory module storing said boot codes to receive a corresponding one of said identifying signals as a high-level digital signal, and the other point-to-point signal pins are electrically connected to respective pull-down resistors to receive all the other identifying signals as low-level digital signals, thereby locating said specific memory module storing therein said boot codes.

12. The core logic device according to claim 8 being a chipset.

13. The core logic device according to claim 8 being a north-bridge chip.

14. The core logic device according to claim 8 wherein said specific memory module is a non-volatile memory module, and the other memory modules are random access memory modules.

15. A method for realizing boot codes from a memory module set, said memory module set including a plurality of memory modules electrically connected to a core logic device via respective signal pins, a specific one of said memory modules storing therein said boot codes exclusively includes a first-level-state pulling resistor coupled to a corresponding one of said signal pins, and said method comprising steps of:

said core logic device receiving identifying signals from said memory modules via said respective signal pins in a booting process, wherein one of said identifying signals received from said specific one of said memory modules is exclusively at said first level state;

said core logic device determining which one of said memory modules is said specific memory module that stores therein said boot codes by locating the exclusive one of said identifying signals at said first level state; and allowing said boot codes to be read out from said memory module storing therein said boot codes.

16. The method according to claim 15 wherein said signal pins are point-to-point signal pins.

17. The method according to claim 16 wherein said point-to-point signal pins are selected from a group consisting of chip select pins and clock enable pins.

18. The method according to claim 15 wherein said first level state is a low-level state, and all the other identifying signals received by said core logic device are at a high-level state.

19. The method according to claim 15 wherein said first level state is a high-level state, and all the other identifying signals received by said core logic device are at a low-level state.

20. The method according to claim 15 wherein said core logic device is a chipset.

21. The method according to claim 15 wherein said core logic device is a north-bridge chip.

22. The method according to claim 15 wherein said memory module for storing said boot codes is a non-volatile memory module, and the other memory modules are random access memory modules.

* * * * *